Oct. 4, 1949.   R. F. DAVIS   2,483,628
PRESSURE COOKER
Filed Sept. 26, 1946   2 Sheets-Sheet 1
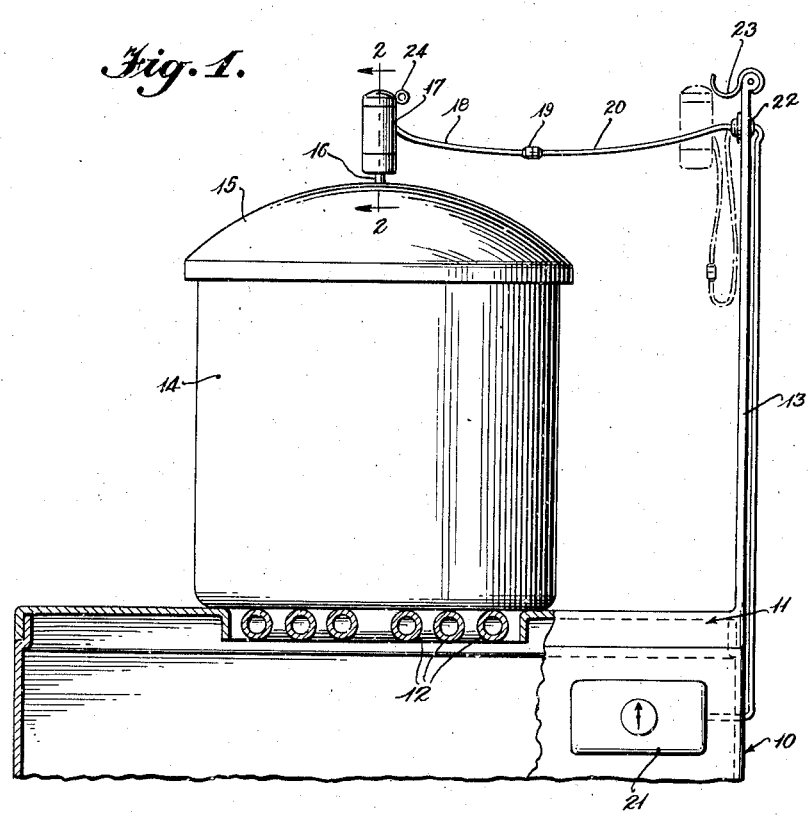
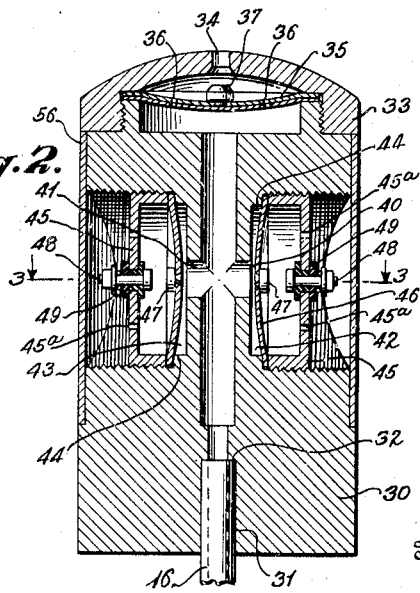
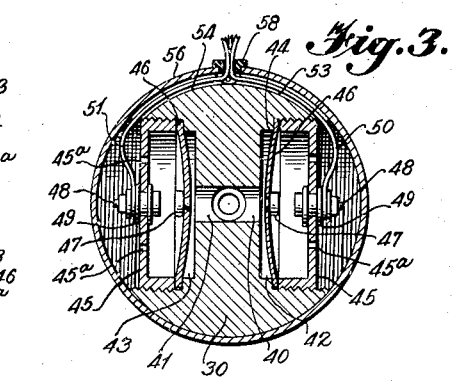
Inventor
Robert F. Davis
By Stevens, Davis and Miller
Attorneys Oct. 4, 1949.  R. F. DAVIS  2,483,628
PRESSURE COOKER
Filed Sept. 26, 1946  2 Sheets-Sheet 2
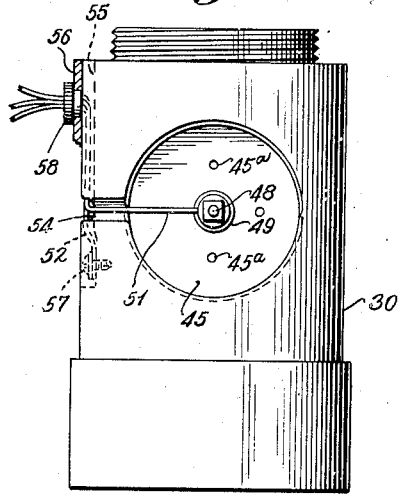
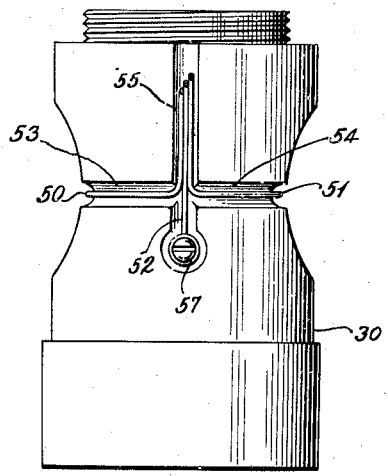
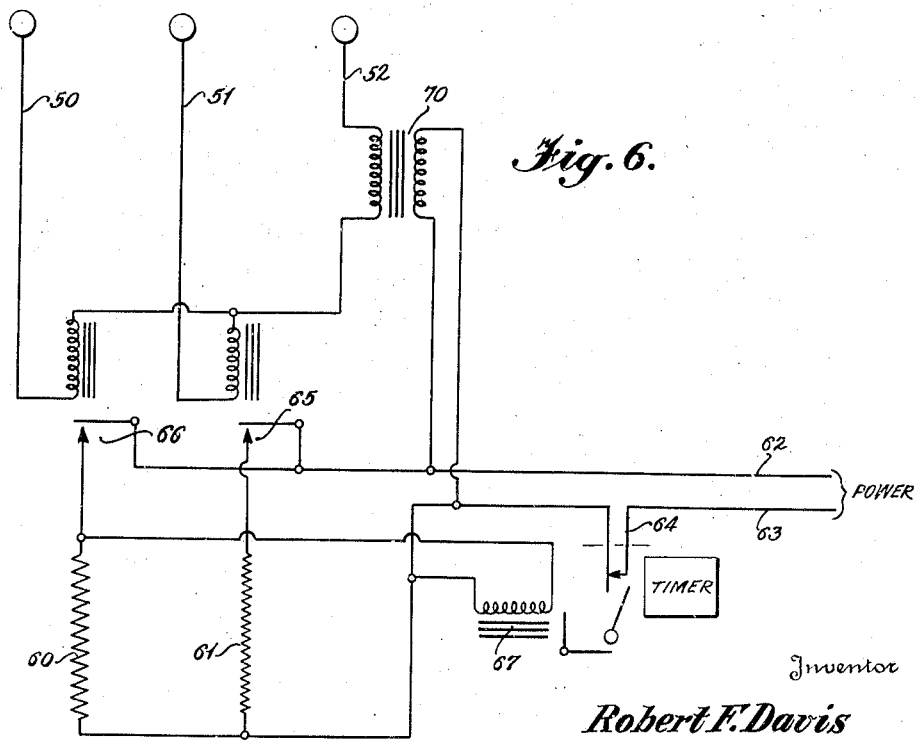
Inventor
Robert F. Davis
By Stevens, Davis and Miller
Attorneys Patented Oct. 4, 1949

2,483,628

UNITED STATES PATENT OFFICE 2,483,628

PRESSURE COOKER

Robert F. Davis, Falls Church, Va.

Application September 26, 1946, Serial No. 699,473

4 Claims. (Cl. 219—43)

1

This invention relates to domestic electric pressure cookers and more particularly to an electrically operated domestic pressure cooker which once set in operation, completes the entire cooking operation without further attention on the part of the operator.

Domestic pressure cookers have recently begun to enjoy great popularity because they are efficient, cook rapidly, and avoid the loss of volatile flavoring materials.

Perhaps the greatest objection that users of such cooking equipment encounter, arises from the necessity of constant supervision by the cook during the operation. The heat must be adjusted at a relatively high level at the beginning of the operation, until sufficient steam has been generated to sweep the cooking vessel clear of entrapped air, the pressure valve must then be affixed to the cooking vessel or closed if it is of the type that is permanently affixed, and then, as the desired pressure is obtained the heat must be readjusted, and thereafter continually adjusted during the cooking process, to maintain the desired pressure. Furthermore, the cooking must be accurately timed and terminated at the expiration of that time, in order to avoid overcooking. This makes it necessary for the cook to watch the pressure, regulate the heat, and watch the lapse of time, constantly, during the cooking operation.

Such attention is an annoyance during the cooking of vegetables which cook in a very few minutes, and become almost unbearable in the cooking of meats and other foods which require periods of time of the order of an hour or more.

It is the purpose of this invention to eliminate the necessity of watching either time or pressure and to provide a domestic, electrically operated, pressure cooking vessel, in which the cook can place the food to be cooked, set a convenient dial, and forget the entire operation until it is finished.

Basically, the device of this invention comprises a pressure-type cooking vessel, an electrical heating element for said cooking vessel, and an electrical control system for said heating element operative in response to time and the conditions inside of the pressure cooker to control the operation of the heating element throughout the cooking cycle.

A more complete understanding of the many details and advantages of this invention may be had by reference to the appended drawings and the following detailed description of the embodiment illustrated therein.

2

In the drawings:

Figure 1 is a side elevational view, partly in section, of a device constructed in accordance with the principles of this invention;

Figure 2 is a sectional view taken on lines 2—2 of the control head which fits on top of the cooking vessel;

Figure 3 is a horizontal cross-sectional view of the same control head taken on lines 3—3 of Figure 2;

Figure 4 is a side elevational view of the control head with the cap and outer shell removed;

Figure 5 is a side elevational view of the same control head turned 90° about its vertical axis; and Figure 6 is a schematic diagram of the electrical wiring of the new device.

As illustrated in Figure 1, the preferred form of automatic electric pressure of this invention comprises a base or frame member 10 upon which is supported a secondary base or frame member 11. In the secondary base member 11 is mounted an electrical heating unit 12, and attached at one edge is an upstanding arm 13 for the purpose of supporting certain parts of the device.

A pressure-type cooking vessel 14 is adapted to rest on the heating unit 12 when the device is in operation and the lid 15 of this vessel has mounted in it the usual safety valve (not shown) and also an upstanding tubular member 16 which communicates with the inside of the cooking vessel.

The upper end of the tube 16 is adapted to support a control head 17, the weight of which prevents it from being lifted off the tube. The control head 17 is connected by a lightweight, three-conductor electrical cable 18, through a disconnecting plug 19, and a similar electrical cable 20 to a control mechanism 21 mounted in the base 10.

In order to prevent the electrical cable 20 from becoming overheated by contact with the pressure cooker, and generally to keep it out of the way, it is supported in the upstanding arm 13 in an insulating bushing 22. A hook 23 is also provided at the upper end of the arm 13 and an eye 24 is provided on the control head, so that the control head may be suspended from the hook at the upper end of the arm 13 when it is not in use.

The control head 17 consists of a body member 30 which is drilled axially at 31 to receive the upstanding tube 16 from the lid of the cooking vessel. A shoulder 32 is provided to limit the penetration of the tube 16 into the control head, but the control head is drilled axially throughout its length to provide passage for air and steam from the cooking vessel.

At its upper end, the control head is covered by a screw cap 33, through which an opening 34 is provided to permit the escape of air at the beginning of the cooking operation. Between the cap 33 and the body 30 of the control head there is mounted a concave-convex bimetal disc 35 drilled at 36 to permit the passage of air therethrough at the beginning of the cooking operation. Mounted on the bimetal disc 35 is a valve member 37. As air is exhausted from the cooking vessel at the beginning of the cooking operation and steam then comes in contact with the bimetal disc 35, the disc snaps into a concave-convex position which is the reverse of that shown in Figure 2, and forces the valve member 37 into the opening 34 thus sealing the cooker.

Laterally extending openings 40 and 41 connect the inner bore of the control head to compartments 42 and 43, respectively, which are formed by drilling into the sides of the control head. Each of these compartments is provided with a shoulder 44 and is screwthreaded above the shoulder to receive a plug 45. Between the plug 45 and the shoulder 44 is held a concave-convex pressure disc 46 normally curved toward the center of the control head. On each of the two pressure discs 46 is mounted an electrical contact 47 which cooperates with another electrical contact 48 mounted in an insulating bushing 49 in the plug 45. Each plug 45 is penetrated by one or more small holes 45a which serve to release pressure from under the plug and also can be used in cooperation with a specially designed wrench to tighten the plugs in place.

Each of the two pressure discs is so constructed that it snaps to a position which is concave-convex in the opposite direction and brings the two cooperating contacts into electrical contact when the pressure reaches a desired level. One of the discs and its related set of contacts operates at a somewhat lower pressure than the other and this disc and its related contacts control a heavier, higher wattage portion of the heating unit so that the vessel will be heated rapidly until it reaches a temperature near that at which it is to operate for the remainder of the cooking process. The other pressure disc operates at a somewhat higher pressure which is the pressure that is desired in the cooking vessel during the cooking operation and its contacts control a lighter, lower wattage portion of the heating unit so as to maintain the pressure in the cooker at exactly the desired level at all times after the pressure has once reached that level.

As can be seen from Figures 4 and 5, connections are made from the pressure disc contacts by means of three insulated electrical wires 50, 51 and 52. Wires 50 and 51 connect to the outer ends of the contacts mounted in the plugs 45 and pass through grooves 53, 54 and 55 to an opening in a surrounding shell 56, where together with wire 52 they become a part of the connecting cable 18. The wire 52 is grounded to the body 30 of the control head at 57 and passes upwardly through the groove 55 to join with the wires 50 and 51.

In the construction illustrated in Figures 4 and 5, the connecting cable 18 can be passed through an insulating bushing 58 mounted in an opening in the surrounding shell 56 while the bushing is still removed from the body member 30. The necessary connections can then be made and thereafter the surrounding shell 56 can be slipped into place and the cap member 33 screwed onto the body member 30 to assemble the control head as one complete unit.

In order to control the operation of the electrical heating unit from the control head 17, the electrical heating unit 12 has been divided into two parts, one of which is a high wattage heating element 60 as illustrated in Figure 6, and the other of which is a low wattage heating element 61 as shown in that same figure. These are connected to a source of power (not shown) through lines 62 and 63. In series with the line 63 is connected a time-operated circuit breaker 64; between the line 62 and the heating element 61 is positioned a magnetic-relay type of circuit breaker 65, and between the line 62 and the heavy heating element 60 is positioned another magnetic relay-type circuit breaker 66.

When the device is at rest, the circuit breakers 65 and 66 are closed, but the dial on the time operated circuit-breaker is at a zero position and the circuit breaker itself is open. When the operator wishes to start the device in operation, he moves the setting knob of the timer so that it indicates the period of time over which he wishes the cooking operation to extend. This releases the time operated circuit breaker, permitting it to close. Immediately power is supplied to the two heating elements and also to a relay 67 which is connected across the heavy heating element and which operates to lock the timer against operation.

Power is also supplied across the pressure-controlled contacts of the control head by means of a small power transformer 70, the primary of which is connected across the leads 62 and 63. The secondary of this transformer, which preferably has an output of only 4 or 5 volts has one side connected to the grounded lead wire 52 of the control head and the other side connected through the magnet coils of relays 65 and 66, respectively, to lead wires 51 and 50 which extend to their respective contacts in the control head.

As the pressure vessel begins to be heated, air is first expelled through the opening 34 in the cap of the control head until steam reaches the snap disc 35 whereupon the opening 34 is closed by the valve member 37 and pressure begins to rise in the vessel. As the pressure reaches that necessary to snap the first pressure disc, that is, the one operating at the lowest pressure, that disc snaps and makes contact between wires 50 and 52 thus energizing the relay 66 and opening the circuit of the heavy heating coil 60 and the timer break relay 67. This starts the timing of the cooking operation.

As the lighter heating element is still continuing to operate, the pressure in the vessel continues to rise, but at a slower rate. Upon reaching the pressure at which the second disc snaps, a circuit is completed through wires 51, 52, the secondary of the transformer 70 and the lighter heating element relay 65. The relay 65 then operates to cut the power off from the lighter heating element. As the pressure drops the pressure disc opens the relay circuit and supplies power again to the lighter heating element. This cycle is repeated as often as necessary to maintain the desired pressure, during the cooking period.

Eventually the timer again reaches the zero position, at which time it opens the timer relay and the cooking operation is automatically ended.

It has been found desirable to provide the timer with an alarm bell or signalling device to recall the operator when the cooking cycle is finished for in many cases it is desirable to immediately cool the cooking vessel to abruptly stop the cooking. This can be done by disconnecting the control head at the disconnecting plug 19, removing the vessel from the heating unit and placing it in cold water.

In the case of meats and some other foods, it is not necessary to cool the cooking vessel quickly. The alarm or signal is not necessary in such operations and a mechanism for silencing it, as in an ordinary alarm clock, may be provided.

It will immediately be apparent to those skilled in the art that numerous modifications in the arrangement of parts and the detailed design of the new device may be made. Thus Sylphon bellows or Bourdon tubes may replace the pressure discs illustrated. Other means may be provided for releasing the air from the cooking vessel. Contact may be broken instead of established to operate the heating unit relays. A single heating element may be used instead of two. Provision may be made for adjusting or changing the pressure of operation.

Pressure cooking is normally accomplished at around 15 pounds per square inch pressure. In such cases it has been found desirable to cut off the larger heating unit at around 10 or 12 pounds of pressure and let the smaller heating unit control the pressure above that pressure. The pressure discs may, however, be set to cook at 10, or even 5, pounds per square inch pressure, or means provided to change the setting as, and when, desired.

The timer is of known design and may be either spring-operated or operated by electrical power from the same source from which the cooker is operated.

In most instances control of the heating elements in accordance with the pressure in the cooking vessel has been found most expedient. Temperature-sensitive elements can be substituted for the pressure elements, if desired however, since the temperature varies with the pressure.

If desired, the device of this invention may be furnished without the pressure cooking vessel itself and used with any one of a number of pressure cooking vessels already on the market. Nearly all such vessels include upstanding steam outlet tubes (similar to tube 16 of Figure 1) and the control head may be used with any one of such cooking vessels. However, since the upstanding tubes vary in size it may be desirable to mount a removable sleeve in the lower end of the control head, the sleeve having an inside base adapted to fit the tube of the particular cooking vessel to be used. By supplying sleeves with a variety of inside diameters the control head can easily be adapted to fit a wide variety of pressure cooking vessels.

What is claimed is:

1. An automatic electric pressure cooking device that comprises at least two electrical heating units, one being of a considerably higher wattage than the other, a pressure cooking vessel adapted to be removably positioned upon said heating units but readily removable therefrom, a lid adapted to be removably fastened to said cooking vessel in pressure-tight relation thereto, a spigot on said lid providing communication from the interior of said cooking vessel to the outside of said cooking vessel, a control head adapted to be removably positioned upon said spigot and maintained there by gravity, said control head having an opening therethrough to permit gases and vapors from the inside of said cooking vessel to escape through the spigot and through the control head to the outside atmosphere, a thermostatically controlled valve in said passage in said control head adapted to close at a predetermined temperature and to remain closed until the temperature falls to a substantially lower temperature to prevent the escape of vapors and gases from the cooking vessel, a pair of pressure responsive switches in said control head in a position where they will be subjected to the pressure of gases and vapors from said spigot even though said thermostatically controlled valve is closed, a readily separable electric connector, relatively short electrical connections from said pressure responsive switches to said electrical connector, a control mechanism, longer electrical connections between said separable connector and said control mechanism, a source of high voltage power connected to said control mechanism, a switch in said control mechanism for controlling said high voltage power, a manually settable timer controlling said switch, means in said control mechanism for converting a portion of said high voltage power into low voltage power for the operation of relays, two relays connected to said source of low voltage relay power and to said pressure responsive switches in said control head through the aforesaid connections so as to operate in accordance with said pressure responsive switches in the control head, connections for connecting said high voltage power through said relays to said high and low wattage heating elements respectively so that one relay controls the high wattage heating element and the other relay controls the low wattage heating element in accordance with the action of its corresponding pressure responsive switch, and a magnetically operated brake for preventing the operation of said timer from the time the main power switch is closed until one of the relay switches opens.

2. In a pressure cooker assembly, a primary circuit having three parallel branches, a pair of heating elements, a pair of relay switches, one of said pair of relay switches and one of said pair of heating elements being in series in each of two of said branches, a stepdown transformer, the primary of said transformer being in the third of said branches, a secondary circuit including the secondary of said stepdown transformer, said secondary circuit having a pair of parallel branches, a pair of normally open pressure switches, a pair of relay coils, one of said pair of pressure switches and one of said pair of relay coils being series connected in each of the branches of said secondary circuit, one of said pair of relay coils being connected to operate each of said switches, said primary circuit, the two branches having the heating element therein, the relay switches and relay coils therefor constituting a heating unit, a cooking vessel separate from said heating unit but adapted to be removably positioned thereon, a quickly detachable lid for said vessel, said pressure switches being mounted in said lid in a position to close in response to the attainment of a predetermined pressure within the said vessel, a normally open vent in said lid, means to close the vent upon the attainment of a predetermined temperature within the vessel, the part of said secondary circuit connecting said pressure switches to said relay coils being a flexible cord whereby the heating unit is rendered wholly separable from the vessel.

3. In a pressure cooker assembly, a primary circuit having three parallel branches, a pair of heating elements, a pair of relay switches, one of said pair of relay switches and one of said pair of heating elements being in series in each of two of said branches, a stepdown transformer, the primary of said transformer being in the third of said branches, a secondary circuit including the secondary of said stepdown transformer, said secondary circuit having a pair of parallel branches, a pair of normally open pressure switches, a pair of relay coils, one of said pair of pressure switches and one of said pair of relay coils being series connected in each of the branches of said secondary circuit, one of said pair of relay coils being connected to operate each of said switches, said primary circuit, the two branches having the heating element therein, the relay switches and relay coils therefor constituting a heating unit, a cooking vessel separate from said heating unit but adapted to be removably positioned thereon, a quickly detachable lid for said vessel, said pressure switches being mounted in said lid in a position to close in response to the attainment of a predetermined pressure within the said vessel, a normally open vent in said lid, means to close the vent upon the attainment of a predetermined temperature within the vessel, the part of said secondary circuit connecting said pressure switches to said relay coils being a flexible cord whereby the heating unit is rendered wholly separable from the vessel, and a manually settable timing device located in the said secondary circuit, said timing device operating in accordance with the operation of the said relay switches and in accordance with a predetermined setting of said device for controlling the length of time that heat is supplied to said cooking vessel by said heating unit.

4. In a pressure cooker assembly, a primary circuit having three parallel branches, a pair of heating elements, a pair of relay switches, one of said pair of relay switches and one of said pair of heating elements being in series in each of two of said branches, a stepdown transformer, the primary of said transformer being in the third of said branches, a secondary circuit including the secondary of said stepdown transformer, said secondary circuit having a pair of parallel branches, a pair of normally open pressure switches, a pair of relay coils, one of said pair of pressure switches and one of said pair of relay coils being series connected in each of the branches of said secondary circuit, one of said pair of relay coils being connected to operate each of said switches, said primary circuit, the two branches having the heating element therein, the relay switches and relay coils therefor constituting a heating unit, a cooking vessel separate from said heating unit but adapted to be removably positioned thereon, a quickly detachable lid for said vessel, said pressure switches being mounted in said lid in a position to close in response to the attainment of a predetermined pressure within the said vessel, the part of said secondary circuit connecting said pressure switches to said relay coils being a flexible cord whereby the heating unit is rendered wholly separable from the vessel.

ROBERT F. DAVIS.

REFERENCES CITED

The following references are of record in the file of this patent:

UNITED STATES PATENTS

| Number | Name | Date |
|---|---|---|
| 1,437,005 | Newsom | Nov. 28, 1922 |
| 1,702,480 | Newsom | Feb. 19, 1929 |
| 1,931,190 | Goughnour | Oct. 17, 1933 |
| 2,194,118 | Graham | Mar. 19, 1940 |
| 2,304,802 | Crew | Dec. 15, 1942 |
| 2,369,932 | Allen | Feb. 20, 1945 |